(12) United States Patent
Etzelsberger et al.

(10) Patent No.: US 10,654,541 B2
(45) Date of Patent: May 19, 2020

(54) CONVERTIBLE SCOOTER

(71) Applicant: URBAN626, LLC, Pasadena, CA (US)

(72) Inventors: Sven Etzelsberger, Pasadena, CA (US); Grant Delgatty, Pasadena, CA (US)

(73) Assignee: URBAN626, LLC, Pasadena, CA (US)

( * ) Notice: Subject to any disclaimer, the term of this patent is extended or adjusted under 35 U.S.C. 154(b) by 105 days.

(21) Appl. No.: 15/655,798

(22) Filed: Jul. 20, 2017

(65) Prior Publication Data

US 2018/0022412 A1 Jan. 25, 2018

Related U.S. Application Data

(60) Provisional application No. 62/434,384, filed on Dec. 14, 2016, provisional application No. 62/383,269,
(Continued)

(51) Int. Cl.
*B62K 15/00* (2006.01)
*B62K 19/08* (2006.01)
(Continued)

(52) U.S. Cl.
CPC ............... *B62K 15/006* (2013.01); *B62J 1/02* (2013.01); *B62J 1/08* (2013.01); *B62K 5/02* (2013.01); *B62K 19/08* (2013.01); *B60K 1/04* (2013.01); *B60K 7/0007* (2013.01); *B60K 2001/0455* (2013.01); *B60K 2001/0483* (2013.01); *B60K 2007/0038* (2013.01); *B60Y 2200/126* (2013.01); *B62J 25/00* (2013.01);
(Continued)

(58) Field of Classification Search
CPC .... B62K 15/00; B62K 15/006; B62K 15/008; B62J 1/08
See application file for complete search history.

(56) References Cited

U.S. PATENT DOCUMENTS

| 1,359,329 A | 11/1920 | Carson |
| 2,135,257 A | 11/1938 | Manton |

(Continued)

FOREIGN PATENT DOCUMENTS

| CN | 2078727 U | 6/1991 |
| CN | 2094497 U | 1/1992 |

(Continued)

OTHER PUBLICATIONS

International Preliminary Report on Patentability for International Application PCT/US2017/043175, Report issued Jan. 22, 2019, dated Jan. 31, 2019, 7 Pgs.

(Continued)

*Primary Examiner* — Barry Gooden, Jr.
(74) *Attorney, Agent, or Firm* — KPPB LLP (57) ABSTRACT

Foldable electrical vehicles and related charging infrastructure are described. The foldable electrical vehicle generally includes three structural members (front and rear wheel-bearing structural members and a seat-bearing structural member) that are pivotally interconnected along their lengths such that they may be pivoted between a closed position wherein the three structural members are disposed roughly parallel to each other in a compact folded configuration, and an open riding configuration wherein an angular relation is formed between the structural members.

19 Claims, 8 Drawing Sheets

Related U.S. Application Data filed on Sep. 2, 2016, provisional application No. 62/364,593, filed on Jul. 20, 2016.

(51) Int. Cl.
| | | |
|---|---|---|
| *B62K 5/02* | (2013.01) | |
| *B62J 1/08* | (2006.01) | |
| *B62J 1/02* | (2006.01) | |
| *B60K 1/04* | (2019.01) | |
| *B60K 7/00* | (2006.01) | |
| *B62J 25/00* | (2020.01) | |
| *B62K 5/027* | (2013.01) | |

(52) U.S. Cl.
CPC .......... *B62K 5/027* (2013.01); *B62K 2202/00* (2013.01); *B62K 2204/00* (2013.01)

(56) References Cited

U.S. PATENT DOCUMENTS

| | | | | |
|---|---|---|---|---|
| 3,354,975 A * | 11/1967 | Stuart | ............. | B62K 15/008 180/208 |
| 3,354,976 A * | 11/1967 | Camps | ............. | B62K 15/008 180/208 |
| 3,419,283 A * | 12/1968 | Newland | ............. | B62K 15/006 280/278 |
| 3,486,765 A | 12/1969 | Turner | | |
| 3,695,496 A | 10/1972 | Humlong | | |
| 4,026,573 A * | 5/1977 | Richardson | ............. | B62K 11/02 180/208 |
| 4,067,589 A | 1/1978 | Hon | | |
| 4,202,561 A | 5/1980 | Yonkers | | |
| 4,282,993 A | 8/1981 | Humlong | | |
| 4,598,923 A | 7/1986 | Csizmadia et al. | | |
| 4,653,767 A | 3/1987 | Gajewski | | |
| D331,906 S | 12/1992 | Mohri | | |
| 5,186,482 A * | 2/1993 | Sapper | ............. | B62K 15/008 280/278 |
| D337,984 S | 8/1993 | Lindahl | | |
| D338,433 S | 8/1993 | Crooks, Sr. | | |
| 5,730,670 A * | 3/1998 | Ferrarin | ............. | B62K 15/006 474/79 |
| 5,741,305 A | 4/1998 | Vincent et al. | | |
| D401,190 S | 11/1998 | Krause | | |
| 6,032,971 A * | 3/2000 | Herder | ............. | B62K 15/008 280/278 |
| D454,814 S | 3/2002 | Ou | | |
| 6,367,832 B1 | 4/2002 | Vogel | | |
| D457,197 S | 5/2002 | Becker | | |
| D464,379 S | 10/2002 | Lin | | |
| D466,839 S | 12/2002 | Ou | | |
| 6,530,589 B1 * | 3/2003 | Ma | ............. | B62K 9/00 280/270 |
| D476,618 S | 7/2003 | Wong et al. | | |
| 6,588,787 B2 | 7/2003 | Ou | | |
| D483,821 S | 12/2003 | Yang | | |
| D487,908 S | 3/2004 | Mayer et al. | | |
| D503,362 S | 3/2005 | Zhu et al. | | |
| 6,877,756 B2 | 4/2005 | Yamabe et al. | | |
| D511,719 S | 11/2005 | Chung | | |
| D513,629 S | 1/2006 | Sramek | | |
| D513,772 S | 1/2006 | Otis et al. | | |
| 6,986,522 B2 | 1/2006 | Sinclair et al. | | |
| D522,076 S | 5/2006 | Casey | | |
| 7,055,842 B1 * | 6/2006 | Lin | ............. | B62K 15/008 280/278 |
| D526,938 S | 8/2006 | Nagel | | |
| D530,650 S | 10/2006 | Azuma et al. | | |
| D544,462 S | 6/2007 | Patel | | |
| D546,277 S | 7/2007 | Andre et al. | | |
| D556,647 S | 12/2007 | Yamagishi et al. | | |
| D561,651 S | 2/2008 | Yamagishi et al. | | |
| D576,920 S | 9/2008 | Yang | | |
| D578,935 S | 10/2008 | Yang | | |
| D584,224 S | 1/2009 | Mori et al. | | |
| D586,265 S | 2/2009 | Lin et al. | | |
| D590,751 S | 4/2009 | Yang | | |
| D608,255 S | 1/2010 | Arnell | | |
| D641,667 S | 7/2011 | Ryan et al. | | |
| D650,724 S | 12/2011 | Chiang | | |
| D654,403 S | 2/2012 | Kyu | | |
| D654,852 S | 2/2012 | Hansen | | |
| 8,146,694 B2 | 4/2012 | Hamidi | | |
| D668,586 S | 10/2012 | Golias et al. | | |
| 8,376,383 B1 | 2/2013 | Lee | | |
| D680,062 S | 4/2013 | Lien | | |
| D689,019 S | 9/2013 | Sato et al. | | |
| D695,156 S | 12/2013 | Jessie et al. | | |
| D726,592 S | 4/2015 | Zhang | | |
| D735,812 S | 8/2015 | Delgatty | | |
| D735,813 S | 8/2015 | Delgatty | | |
| 9,120,523 B2 * | 9/2015 | Wu | ............. | B62K 15/008 |
| D743,887 S | 11/2015 | Dasbach | | |
| 9,205,889 B2 | 12/2015 | Paick | | |
| D746,924 S | 1/2016 | Delgatty | | |
| 9,227,687 B2 | 1/2016 | Delgatty et al. | | |
| D750,711 S | 3/2016 | Delgatty | | |
| 9,283,848 B2 | 3/2016 | Parienti | | |
| 9,376,158 B1 | 6/2016 | Mccormick et al. | | |
| D767,469 S | 9/2016 | Liu | | |
| 9,440,699 B1 | 9/2016 | Wittorf et al. | | |
| D774,979 S | 12/2016 | Delgatty et al. | | |
| D777,606 S | 1/2017 | Dai | | |
| D784,206 S | 4/2017 | Zhang | | |
| D786,740 S | 5/2017 | Abe et al. | | |
| D788,698 S | 6/2017 | Lin | | |
| 9,694,868 B2 | 7/2017 | Delgatty et al. | | |
| D804,364 S | 12/2017 | Xianqiang | | |
| 9,873,476 B2 | 1/2018 | Etzelsberger et al. | | |
| D820,201 S | 6/2018 | Delgatty et al. | | |
| D826,788 S | 8/2018 | Hu | | |
| D827,035 S | 8/2018 | Delgatty et al. | | |
| D832,150 S | 10/2018 | Etzelsberger et al. | | |
| 2001/0000394 A1 | 4/2001 | Whittaker | | |
| 2002/0140245 A1 | 10/2002 | Coleman, II et al. | | |
| 2003/0030242 A1 * | 2/2003 | Lopez | ............. | B62K 3/002 280/226.1 |
| 2003/0051934 A1 | 3/2003 | Ou et al. | | |
| 2003/0098567 A1 * | 5/2003 | Chuang | ............. | B62K 9/02 280/293 |
| 2004/0026147 A1 | 2/2004 | Kao et al. | | |
| 2005/0001404 A1 | 1/2005 | Mihelic | | |
| 2005/0035570 A1 | 2/2005 | Chu | | |
| 2005/0040616 A1 | 2/2005 | Cheng | | |
| 2005/0263979 A1 * | 12/2005 | Sinclair | ............. | B62K 15/006 280/278 |
| 2006/0243507 A1 | 11/2006 | Huber | | |
| 2006/0244237 A1 * | 11/2006 | Chuang | ............. | B62K 15/006 280/278 |
| 2006/0244418 A1 | 11/2006 | Liao et al. | | |
| 2007/0057482 A1 * | 3/2007 | Hsu | ............. | B62K 15/008 280/278 |
| 2007/0069499 A1 * | 3/2007 | Lin | ............. | B62K 15/008 280/287 |
| 2007/0158928 A1 * | 7/2007 | Wu | ............. | B62K 15/008 280/278 |
| 2007/0258758 A1 | 11/2007 | Ho | | |
| 2008/0061528 A1 | 3/2008 | Musabi et al. | | |
| 2008/0185812 A1 * | 8/2008 | Liu | ............. | B62H 1/12 280/278 |
| 2008/0217085 A1 | 9/2008 | Wernli et al. | | |
| 2008/0224441 A1 | 9/2008 | Lu | | |
| 2009/0020350 A1 | 1/2009 | Wu | | |
| 2009/0240858 A1 | 9/2009 | Takebayashi et al. | | |
| 2009/0289434 A1 | 11/2009 | Lin | | |
| 2010/0006721 A1 | 1/2010 | Lien | | |
| 2010/0066054 A1 * | 3/2010 | Chen | ............. | B62K 15/008 280/278 |
| 2010/0148467 A1 * | 6/2010 | Hoerdum | ............. | B62K 15/008 280/278 |
| 2010/0224662 A1 | 9/2010 | Crum et al. | | |
| 2010/0291418 A1 | 11/2010 | Zhou et al. | | |

(56) References Cited

U.S. PATENT DOCUMENTS

| | | | |
|---|---|---|---|
| 2010/0295264 A1 | 11/2010 | Denais | |
| 2010/0320717 A1 | 12/2010 | Huang | |
| 2011/0181014 A1* | 7/2011 | Ryan | B62K 15/008 280/263 |
| 2011/0193313 A1 | 8/2011 | Yun | |
| 2012/0009804 A1 | 1/2012 | Heichal et al. | |
| 2012/0043148 A1 | 2/2012 | Brady et al. | |
| 2012/0094162 A1 | 4/2012 | Gyenes | |
| 2012/0152993 A1 | 6/2012 | Chen | |
| 2012/0273287 A1 | 11/2012 | Song et al. | |
| 2013/0043826 A1 | 2/2013 | Workman et al. | |
| 2014/0225348 A1 | 8/2014 | Wu | |
| 2014/0326525 A1 | 11/2014 | Doerksen | |
| 2015/0068828 A1* | 3/2015 | Delgatty | B62K 5/06 180/210 |
| 2015/0209205 A1 | 7/2015 | Ransenberg | |
| 2015/0225033 A1* | 8/2015 | Yap | B62K 15/006 280/259 |
| 2015/0321722 A1 | 11/2015 | Dadoosh et al. | |
| 2016/0009255 A1 | 1/2016 | Droste | |
| 2016/0016629 A1 | 1/2016 | Wang et al. | |
| 2016/0083039 A1 | 3/2016 | Delgatty et al. | |
| 2016/0297495 A1* | 10/2016 | He | B62K 15/008 |
| 2016/0347397 A1 | 12/2016 | Etzelsberger et al. | |
| 2017/0021885 A1 | 1/2017 | Montague | |
| 2017/0190377 A1* | 7/2017 | Ku | B62D 61/04 |
| 2017/0247075 A1* | 8/2017 | Kano | B62K 5/06 |
| 2017/0259871 A1 | 9/2017 | Delgatty et al. | |
| 2018/0015978 A1 | 1/2018 | Delgatty et al. | |
| 2018/0079319 A1 | 3/2018 | Etzelsberger et al. | |
| 2018/0099722 A1 | 4/2018 | Etzelsberger et al. | |
| 2018/0118299 A1 | 5/2018 | Lu | |
| 2018/0194426 A1* | 7/2018 | Chiang | B62K 15/006 |
| 2018/0338877 A1* | 11/2018 | Kano | A61G 5/047 |
| 2019/0202519 A1 | 7/2019 | Etzelsberger et al. | |

FOREIGN PATENT DOCUMENTS

| | | |
|---|---|---|
| CN | 2095153 U | 2/1992 |
| CN | 2120052 U | 10/1992 |
| CN | 2125542 U | 12/1992 |
| CN | 2145148 Y | 11/1993 |
| CN | 1086775 A | 5/1994 |
| CN | 2178674 Y | 10/1994 |
| CN | 2194325 Y | 4/1995 |
| CN | 2214343 Y | 12/1995 |
| CN | 2217560 Y | 1/1996 |
| CN | 2270004 Y | 12/1997 |
| CN | 2280042 Y | 4/1998 |
| CN | 2350284 Y | 11/1999 |
| CN | 2444866 Y | 8/2001 |
| CN | 2446039 Y | 9/2001 |
| CN | 3232356 D | 4/2002 |
| CN | 2598831 Y | 1/2004 |
| CN | 2609827 Y | 4/2004 |
| CN | 3346886 D | 4/2004 |
| CN | 2623589 Y | 7/2004 |
| CN | 3377320 D | 7/2004 |
| CN | 2644281 Y | 9/2004 |
| CN | 2711022 Y | 7/2005 |
| CN | 2721500 Y | 8/2005 |
| CN | 2758196 Y | 2/2006 |
| CN | 200957871 Y | 10/2007 |
| CN | 200992276 Y | 12/2007 |
| CN | 201016020 Y | 2/2008 |
| CN | 300832206 D | 9/2008 |
| CN | 201442629 U | 4/2010 |
| CN | 101708758 A | 5/2010 |
| CN | 201447025 U | 5/2010 |
| CN | 201647016 U | 11/2010 |
| CN | 201849580 U | 6/2011 |
| CN | 201849584 U | 6/2011 |
| CN | 102248983 A | 11/2011 |
| CN | 101804839 B | 12/2011 |
| CN | 202186467 U | 4/2012 |
| CN | 202320664 U | 7/2012 |
| CN | 202491886 U | 10/2012 |
| CN | 202624536 U | 12/2012 |
| CN | 302232853 S | 12/2012 |
| CN | 202703785 U | 1/2013 |
| CN | 202863671 U | 4/2013 |
| CN | 103072658 A | 5/2013 |
| CN | 103171719 A | 6/2013 |
| CN | 203268251 U | 11/2013 |
| CN | 302709415 S | 1/2014 |
| CN | 103600798 A | 2/2014 |
| CN | 302729747 S | 2/2014 |
| CN | 104290843 A | 1/2015 |
| CN | 204137242 U | 2/2015 |
| CN | 303101631 S | 2/2015 |
| CN | 204399396 U | 6/2015 |
| CN | 204567915 U | 8/2015 |
| CN | 104875828 A | 9/2015 |
| CN | 204606081 U | 9/2015 |
| CN | 204801982 U | 11/2015 |
| CN | 105151197 A | 12/2015 |
| CN | 204846216 U | 12/2015 |
| CN | 205010403 U | 2/2016 |
| CN | 205010404 U | 2/2016 |
| CN | 105416481 A | 3/2016 |
| CN | 105501369 A | 4/2016 |
| CN | 205186428 U | 4/2016 |
| CN | 205186430 U | 4/2016 |
| CN | 105539680 A | 5/2016 |
| CN | 105539688 A | 5/2016 |
| CN | 105539691 A | 5/2016 |
| CN | 205220935 U | 5/2016 |
| CN | 105722752 A | 6/2016 |
| CN | 205396364 U | 7/2016 |
| CN | 205469551 U | 8/2016 |
| CN | 205469567 U | 8/2016 |
| CN | 205554440 U | 9/2016 |
| CN | 205602020 U | 9/2016 |
| CN | 106043555 A | 10/2016 |
| CN | 205737898 U | 11/2016 |
| CN | 205819446 U | 12/2016 |
| CN | 106965898 A | 7/2017 |
| CN | 103723227 B | 9/2017 |
| CN | 304380162 S | 12/2017 |
| CN | 304466558 S | 1/2018 |
| CN | 304829242 S | 9/2018 |
| CN | 304829244 S | 9/2018 |
| CN | 105722752 B | 1/2019 |
| DE | 19516763 A1 | 11/1996 |
| EP | 3063056 A1 | 9/2016 |
| EP | 3063056 B1 | 8/2018 |
| EP | 3487753 A1 | 5/2019 |
| FR | 1249891 A | 1/1961 |
| FR | 2816265 A1 | 5/2002 |
| FR | 2844248 A1 | 3/2004 |
| GB | 2106450 B | 3/1985 |
| GB | 2379641 A | 3/2003 |
| GB | 2427392 B | 7/2007 |
| JP | 04358984 A | 12/1992 |
| JP | 06329068 A | 11/1994 |
| JP | 07052857 A | 2/1995 |
| JP | 1155291 D | 10/2002 |
| KR | 200339371 Y1 | 1/2004 |
| KR | 30358808 | 8/2004 |
| MX | 2016003213 A | 6/2017 |
| WO | 9801334 A1 | 1/1998 |
| WO | 2011098887 A1 | 8/2011 |
| WO | 2011099717 A2 | 8/2011 |
| WO | 2015038674 A1 | 3/2015 |
| WO | 2016045318 A1 | 3/2016 |
| WO | 2016196510 | 12/2016 |
| WO | 2017017067 A1 | 2/2017 |
| WO | 2017177677 A1 | 10/2017 |
| WO | 2018017898 A1 | 1/2018 |
| WO | 2018057767 A1 | 3/2018 |
| WO | 2019032545 A1 | 2/2019 |

(56) References Cited

FOREIGN PATENT DOCUMENTS

| WO | 2019032566 A1 | 2/2019 |
| WO | 2019033015 A1 | 2/2019 |

OTHER PUBLICATIONS

International Search Report and Written Opinion for International Application No. PCT/US2018/045551, Search completed Oct. 2, 2018, dated Nov. 2, 2018, 13 Pgs.
International Search Report and Written Opinion for International Application No. PCT/US2018/045578, Search completed Oct. 8, 2018, dated Oct. 22, 2018, 15 Pgs.
International Search Report and Written Opinion for International Application No. PCT/US2018/046294, Search completed Oct. 2, 2018, dated Nov. 1, 2018, 15 Pgs.
"Urb-E Sport GT", Urb-E.com, Jun. 28, 2017.
Chinese Design No. 201330204981.8, filed May 24, 2013, Published Jan. 8, 2014 as 302709415.
Chinese Design No. 201430564490.9, filed Dec. 31, 2014, Published May 6, 2015 as 303197333.
Chinese Design No. 201530021961.6, filed Jan. 21, 2015, Published Oct. 7, 2015 as 303403049.
Chinese Design No. 201530049360.6, filed Feb. 26, 2015, Published Jul. 29, 2015 as 303307665.
Chinese Design No. 201530345978.7, filed Sep. 9, 2015, Published Dec. 23, 2015 as 303519704.
Chinese Design No. 201530360131.6, filed Sep. 17, 2015, Published Jan. 6, 2016 as 303541390.
Chinese Design No. 201530374219.3, filed Sep. 25, 2015, Published Jan. 27, 2016 as 303572100.
Chinese Design No. 201530421908.5, filed Oct. 28, 2015, Published Mar. 30, 2016 as 303627516.
Chinese Design No. 201630011386.6, filed Jan. 13, 2016, Published Jun. 22, 2016 as 303718360.
Chinese Design No. 201630299422.3, filed Jul. 2, 2016, Published Oct. 19, 2016 as 303895582.
European Design No. 001890740-0001, filed Jul. 13, 2011, Published Aug. 29, 2011 as 2011/195 A.1.
European Design No. 002318303-0002, filed Sep. 30, 2013, Published Oct. 4, 2013 as 2013/189 A.1.
European Design No. 002549568-0001, filed Oct. 2, 2014, Published Apr. 5, 2017 as 2017/066 A.1.
European Design No. 002804146-0001, filed Sep. 29, 2015, Published Nov. 16, 2015 as 2015/217 A.1.

International Preliminary Report on Patentability for International Application PCT/US2016/035093, Report issued Dec. 5, 2017, dated Dec. 14, 2017, 7 Pgs.
International Search Report and Written Opinion for International Application No. PCT/US2017/052763, Search completed Nov. 13, 2017, dated Nov. 29, 2017, 11 Pgs.
International Search Report and Written Opinion for International Application No. PCT/US2017/043175, Search completed Sep. 10, 2017, dated Sep. 28, 2017, 14 Pgs.
"7 electric scooters that will change the way you commute", Business Insider, https://www.businessinsider.In/7-electric-scooters-that-will-change-the-way-you-commute/CycleBoard/slideshow/57044040.cms, Feb. 8, 2017, 6 pgs.
"Stigo Scooter User Manual", https://stigobike.com/wp-content/uploads/2017/12/Stigo-manual-EN-1.pdf, 2017, 30 pgs.
"URB-E SPORT", URB-E, https://www.urb-e.com/sport/, Jan. 8, 2017, 11 pgs.
Extended European Search Report for European Application No. 14843829.4, Search completed Mar. 9, 2017, dated Mar. 16, 2017, 10 Pgs.
International Preliminary Report on Patentability for International Application PCT/US2014/055033, Report issued Mar. 15, 2016, dated Mar. 24, 2016, 5 Pgs.
International Search Report and Written Opinion for International Application No. PCT/US2016/035093, Search completed Jul. 26, 2016, dated Aug. 25, 2016, 8 Pgs.
International Search Report and Written Opinion for International Application PCT/US2014/055033, Report Completed Nov. 16, 2014, dated Dec. 19, 2014.
"ILY-A", ARS Electronica, Sep. 7, 2015, Retrieved from the Internet URL: http://www.aec.at/postcity/en/ily-a/ on Jul. 8, 2016.
Crook, "Urb-E, The Fold-Up Electric Scooter, Goes Live on Indiegogo", Feb. 10, 2014, URL: https://techcrunch.com/2014/02/10/urb-e-the-fold-up-electric-scooter-goes-live-on-indiegogo/ on Apr. 30, 2017.
Mok, Kimberley, "Halfbike: Upright simplified bike combines biking with jogging (Video)", Tree Hugger., Mar. 21, 2014, Retrieved from the Internet URL: http://www.treehugger.com/bikes/halfbike-kolelinia-upright-simplified-bike-combines-biking-with-jogging.html on Jul. 8, 2016.
Prigg, "Is this the future of commuting? Worlds smallest e-vehicle revealed-and it is controlled by an app", Daily Mail, Feb. 25, 2014, Retrieved from the Internet URL: http://www.dailymail.co.uk/sciencetech/article-2567972/Is-future-commuting-Worlds-smallest-e-vehicle-revealed-controlled-app.html on Jul. 8, 2016.
Seth, Radhika, "Get a Jiffy Ride", YD—Yanko Design., Feb. 9, 2010, Retrieved from the Internet URL: http://www.yankodesign.com/2010/02/09/get-a-jiffy-ride/ on Jul. 8, 2016.

* cited by examiner

CONVERTIBLE SCOOTER

CROSS-REFERENCE TO RELATED APPLICATION

The current application claims priority to U.S. Provisional Patent Application Nos. 62/364,593, entitled "Convertible Scooter" to Etzelsberger et al., filed Jul. 20, 2016; 62/383,269, entitled "Convertible Scooter" to Etzelsberger et al., filed Sep. 2, 2016; and 62/434,384, entitled "Convertible Scooter" to Etzelsberger et al., filed Dec. 14, 2016 the disclosures of which are incorporated herein by reference.

FIELD OF THE INVENTION

Compact, foldable electric vehicles are described.

BACKGROUND OF THE INVENTION

A common difficulty encountered in public transport is in trying to move people from a transportation hub, like a railway station, bus stop, etc. to their desired destination, or from their origination point to a transport hub. These problems are referred to as the 'last mile' or 'first mile' problem, respectively. Where the population of a place is not dense, like in areas where there are extensive suburbs and exurbs, this difficulty can become chronic making public transport impractical. A number of solutions have been proposed to overcome this problem, including community transportation such as feeder transport and ride or car sharing programs, however, these methods require a social infrastructure that is often either not available or not extensive enough to meet commuter needs. Other solutions involve various forms of portable transport, such as bicycles. Most of these personal forms of transportation are relatively bulky and present challenges in storage at both ends of the commute, as well as transport within most public transport systems.

Accordingly, a need exists for personal transport devices and infrastructure capable of addressing the 'last mile'/'first mile' challenge.

BRIEF SUMMARY OF THE INVENTION

The application is directed to portable electric vehicles and infrastructure for portable electric vehicles that are convertible into handcarts.

Many embodiments are directed to a foldable vehicle including:
  at least two wheel-bearing structural members having first and second ends and defining a wheel-bearing structural member longitudinal axis, each of said wheel-bearing structural members having at least one wheel assembly interconnected to the second end thereof and two wheel bearing structural member pivot interconnections disposed along the lengths thereof;
  at least one seat-bearing structural member having first and second ends and defining a seat-bearing structural member longitudinal axis, the seat bearing structural member having a seating platform interconnected to the second end thereof and at least two seat-bearing pivot interconnections disposed along the length thereof; and
  wherein the at least one wheel-bearing structural member pivot interconnection disposed on the end of each of the wheel-bearing structural members distal to the wheel assemblies are pivotably interconnected, and wherein the at least one wheel-bearing structural member pivot interconnections disposed on the lengths thereof are pivotably interconnected with the seat-bearing pivot interconnections and are configured to cooperatively interconnect to form a vehicle pivot mechanism such that the structural members are pivotably interconnected to move between at least two configurations:
    a first riding configuration wherein the longitudinal axes of the two wheel-bearing structural members and the seat-bearing structural members have angular offsets relative to each other, and
    a second folded configuration wherein the longitudinal axes of the two wheel-bearing structural members and the seat-bearing structural member are roughly parallel.

In other embodiments, the foldable vehicle includes a steering mechanism interconnected with at least one of said wheel-bearing structural members and configured to change to directional orientation of at least one wheel assembly relative to the vehicle. In some such embodiments the vehicle includes a front wheel-bearing structural member and a rear wheel-bearing structural member.

In still other embodiments, the foldable vehicle includes a front wheel assembly lock configured to prevent changes to the directional orientation of the wheel assembly of the front wheel-bearing structural member when in the folded configuration.

In some such embodiments at least a portion of the front wheel-bearing structural member defines an internal volume having an energy storage device disposed therein.

In yet other embodiments, the steering mechanism is at least one handlebar, and wherein the height and angle of the handlebar relative to the vehicle is adjustable.

In still yet other embodiments, the foldable vehicle includes a pivot locking mechanism configured to disengageably lock the structural members in at least the closed/compact configuration. In some such embodiments, the pivot locking mechanism includes a latch disposed on the seat-bearing member and configured to engage at least one of the at least two wheel—bearing structural members.

In still yet other embodiments, the rear wheel-bearing structural member is tubular.

In still yet other embodiments, the foldable vehicle includes a locking mechanism disengagement element disposed on the seat-bearing structural member and configured to disengage when the seat-bearing structural member is pivoted upward relative to the axial alignment of the seat-bearing structural member in the second compacted configuration.

In still yet other embodiments, the foldable vehicle includes a seat support element engaged at a first end thereof along the length of the seat-bearing structural member and slidingly engaged at a second end thereof along the length of one of the at least two wheel-bearing structural members such that a roughly triangular configuration is formed between the seat-bearing structural member, the at least one wheel-bearing structural member and the seat support element. In some such embodiments, the axis of the seat support element is roughly orthogonal with the axis of the seat-bearing structural member. In some such embodiments, the seat support element comprises a resilient wheel or cylinder.

In still yet other embodiments, the vehicle includes two wheel-bearing structural members, a front wheel-bearing element having a front wheel assembly with a single wheel, and a rear wheel-bearing element having a rear wheel assembly with at least one wheel. In some such embodiments the rear wheel assembly comprises at least two wheels interconnected via a fixed axle.

In still yet other embodiments, the foldable vehicle includes at least one electric motor disposed within at least one of the wheel assemblies and an energy storage device interconnected therewith.

In still yet other embodiments, the foldable vehicle includes an electronics interconnection disposed thereon, the electronics interconnection in signal communication with at least one sensor configured to deliver information on at least one vehicle parameter and deliver information from the at least one sensor to the personal electronic device. In some such embodiments, the at least one vehicle parameter is selected from the group consisting of vehicle speed, energy consumption, energy reserve, mileage, and direction.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Turning now to the drawings, foldable electric vehicles are described. In many embodiments, the foldable electric vehicle generally comprises a plurality of structural members all cooperatively moveable between a folded position wherein the structural members are in a compact configuration suitable for storing and transporting the vehicle, and an open position wherein the structural members are in a riding configuration suitable for the operation of the vehicle. In many such embodiments, the pivotable structural members may have disposed thereon wheels, motors, charge storage devices, power distribution and control circuits, motor and vehicle controls and instruments, accessories and all other necessary devices and structures for the operation of the vehicle.

In some embodiments, the vehicle comprises two wheel-bearing structural members (front and rear structural members), and a seat structural member that are all pivotally interconnected along their lengths such that they may be moved between a closed position wherein the three structural members are disposed roughly parallel to each other in a compact folded configuration, and an open riding configuration wherein a downward acute angle is formed between the two structural wheel-bearing structural members, and the seat structural member is disposed in a position to support a rider atop the vehicle.

In many embodiments, a plurality of pivot points exist between the three structural members. In various embodiments each of the structural members includes at least two pivot points, one on each member to interconnect the member to the other members. In some embodiments the front and rear structural members are pivotably interconnected each at an end thereof distal to the wheels, and the front and rear structural members are also pivotably interconnected each to the seat member at a point along their length, to form an overall 'A-frame' configuration for the vehicle when in the riding position. In some embodiments the seat member is attached to the front wheel member at an end thereof distal to the seat, and is attached to the rear wheel at a point along its length between the front member pivot point and the seat. In some such embodiments the pivot interconnection between the rear structural member and the seat member includes an elongated bracket such that movement of the members is linked. In other embodiments the seat arm includes a locking mechanism, such as, for example, a latch arm that engages against the end of the rear structural member distal to the rear wheel such that the vehicle is locked into the folded configuration.

In many other embodiments one of the structural members is configured to enclose a power source, such as, for example, a battery or plurality of batteries. In many embodiments this power source enclosing structural member is disposed as the front structural member of the vehicle, and bears the front wheel thereof. In many embodiments, the pivotable second wheel-bearing structural member includes one or more rear wheels at the distal end thereof. It will be understood that the rear wheel assembly may include a single wheel or multiple wheels interconnected via an axle.

In various embodiments, the front wheel-bearing structural member comprises a pivotable portion proximal to the wheel that is pivotably interconnected to a steering mechanism disposed at the end of the front wheel-bearing structural member distal from the wheel. In some such embodiments the steering mechanism comprises at least a handlebar of any suitable design. In some embodiments the front wheel-bearing structural member is a hollow volume, wherein at least the pivotable portion of the member forms a volume into which a energy storage device is disposed.

The folding mechanism of the vehicle, in many embodiments, interconnects the three structural members of the vehicle in a configuration that allows the disengagement of the riding position and the folding of the structural members of the vehicle via the manipulation of one of the structural members of the vehicle. In some such embodiments, the folding mechanism is disengaged by manipulating the seat bearing structural member of the vehicle. In other embodiments a locking latch mechanism is provided to prevent the unfolding of the vehicle once in a compact configuration absent the disengagement of the latch. In various such embodiments the latch mechanism engaged the top of the rear wheel bearing member when in a compact configuration thereby preventing the members from pivoting relative to one another.

Figure 1A:
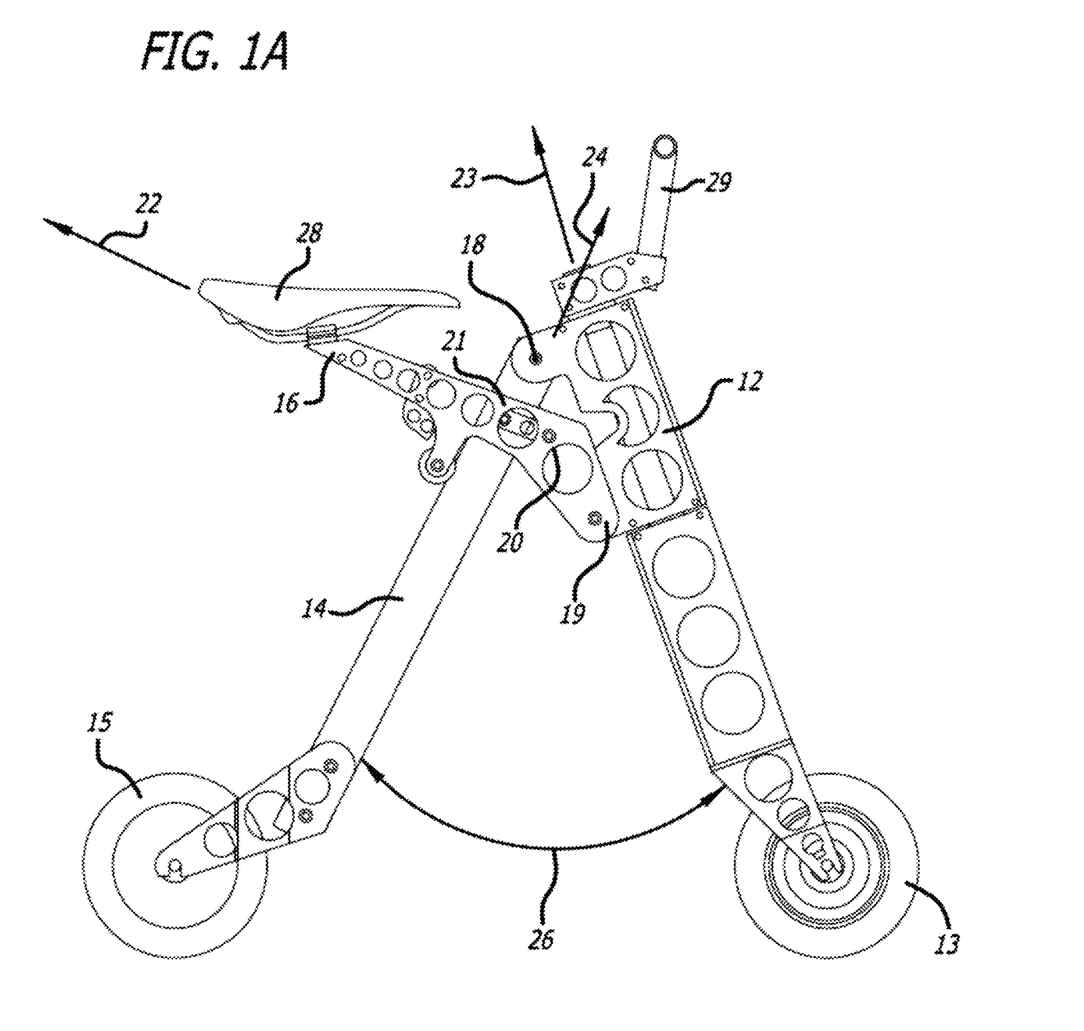
FIGS. 1a to 1c provide side views of a foldable electric vehicle in an open riding configuration in accordance with embodiments of the invention.
Figure 1B:
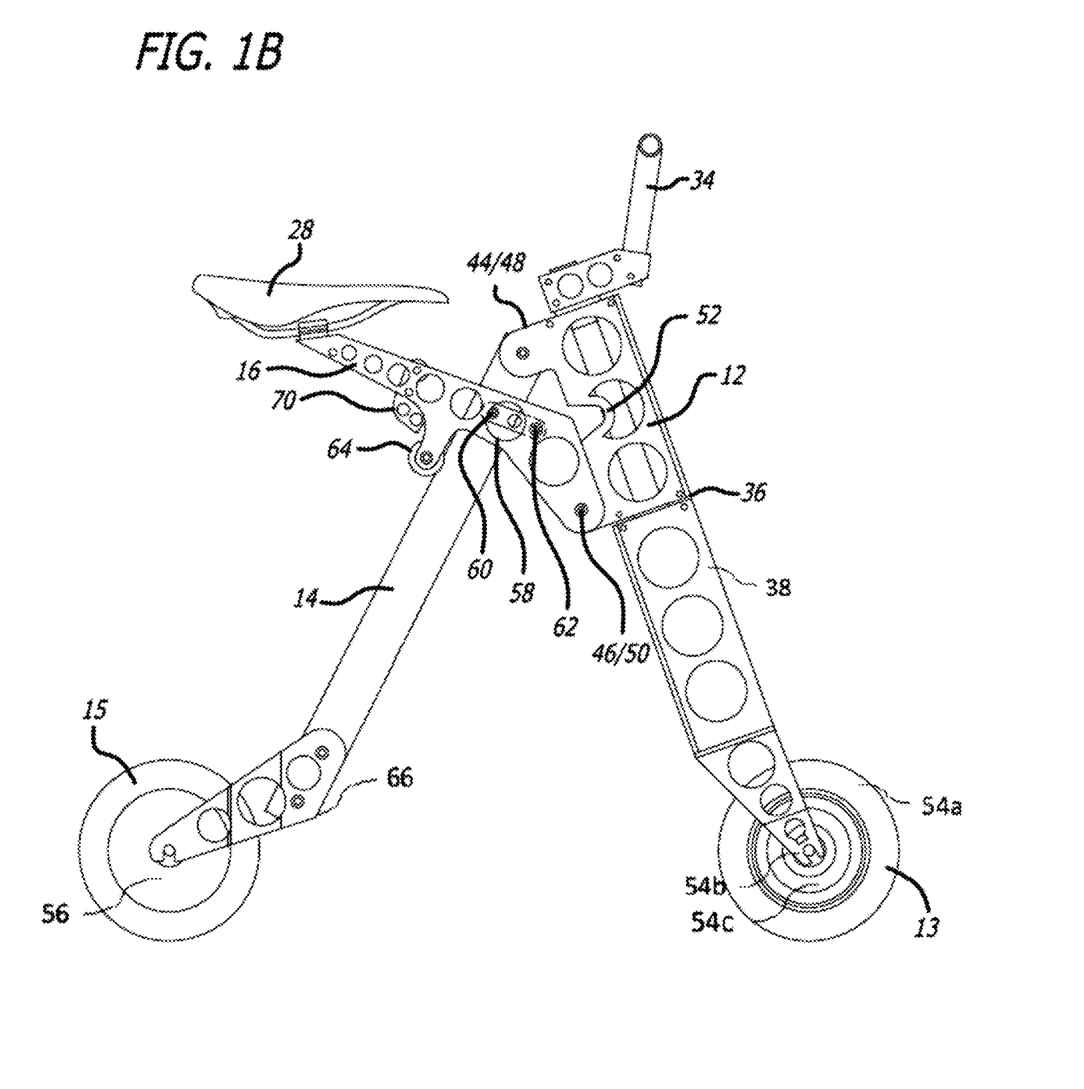
Figure 1C:
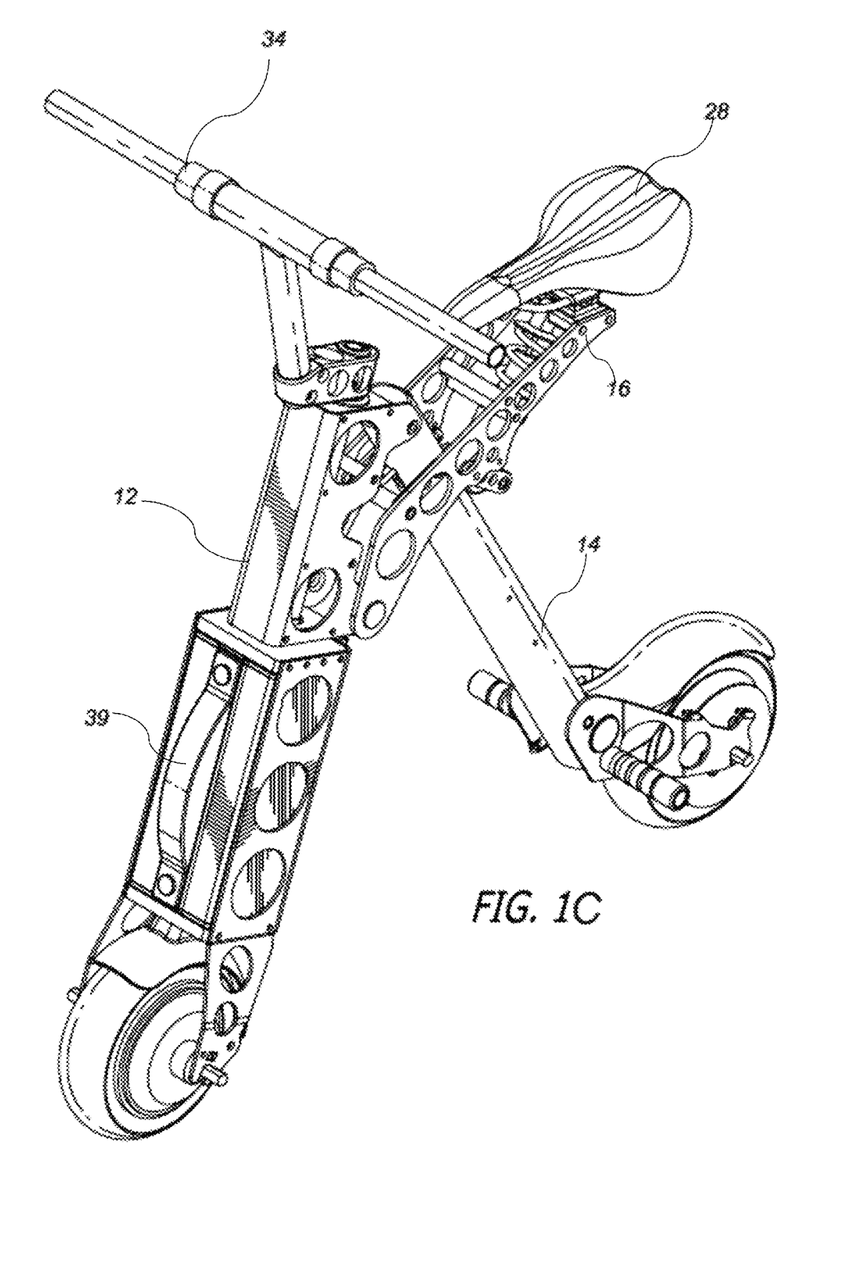

As shown in FIGS. 1a to 1c, in many embodiments a foldable vehicle is provided comprising at least three structural members: a front wheel-bearing structural member (12) having disposed at the distal end thereon at least a front wheel assembly (13), a rear wheel-bearing structural member (14) having disposed at the distal end thereon at least a rear wheel assembly (15), and a seat-bearing structural member (16) for supporting a rider while operating the vehicle. These structural members are pivotally connected each to the other through a plurality of pivot points (18, 19, 20 and 21) that allows movement of the structural members from an open riding configuration, shown in the embodiments shown in FIGS. 1a and 1b, to a folded compact configuration, shown in the embodiments shown in FIGS. 2a and 2b.

As shown, in FIG. 1a, the relative arrangement of the structural members of the vehicle in these configurations may be defined by the axial arrangement of the structural members relative to each other, wherein each structural member is defined by an axis (22, 23 and 24). In some embodiments in the open riding configuration the front and rear structural members (12 & 14) are positioned such that a downward acute angle (26) is created between the axes (23 & 24) of the two wheel-bearing structural members. Although a particular angular arrangement is provided in FIGS. 1a and 1b, it should be understood that any angle suitable to form a usable riding configuration may be formed depending on the specific arrangement and geometry of the wheels and structural members desired. For example, a suitable angle may be determined by factors such as the distance between the wheels of the vehicle, the height of the seat to the ground, etc.

In addition, in some embodiments of this open riding configuration the seat-bearing structural member (16) is pivoted such that its axis (22) is disposed at an angle relative to the ground such that a riding platform (28) is formed on which a rider may be seated to operate the vehicle. As shown in FIG. 1a, in some embodiments the riding platform (28) may be configured such that its axis (22) is roughly parallel to the ground. In other embodiments adjustment mechanisms may be provided to adjust the position of the riding platform relative to the wheel-bearing structural members as desired by the rider. In such embodiments adjustments might include height relative to the ground, distance relative to the handlebars (29), angle relative to the pivot points (19 & 21), etc. Although one embodiment of a riding platform (28) comprising a bicycle-style seat is shown in FIG. 1a, it will be understood that the riding platform may take any form, style or shape suitable to support a rider.

Figure 2A:
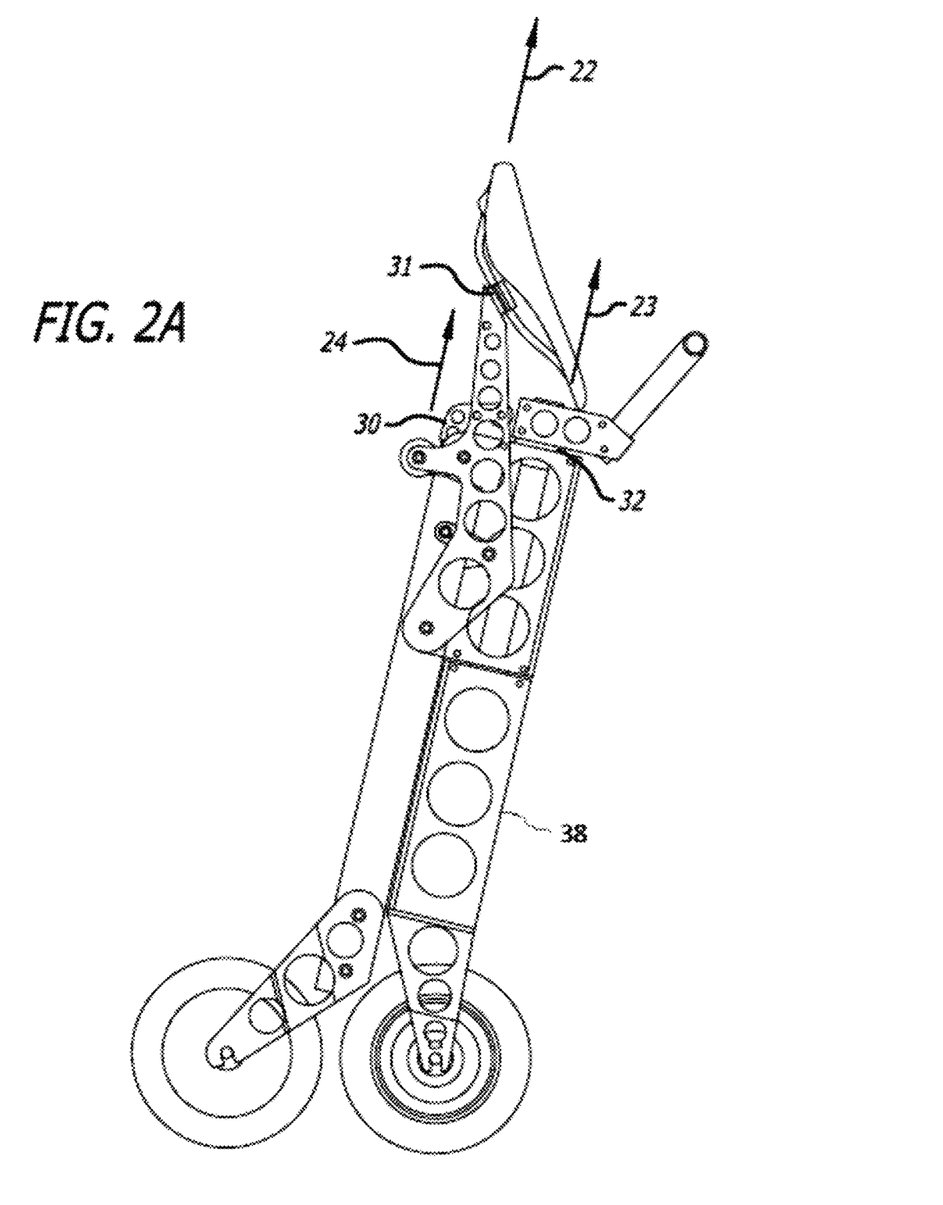
FIGS. 2a and 2b provide side views of a foldable electric vehicle in a compacted configuration in accordance with embodiments of the invention.
Figure 2B:
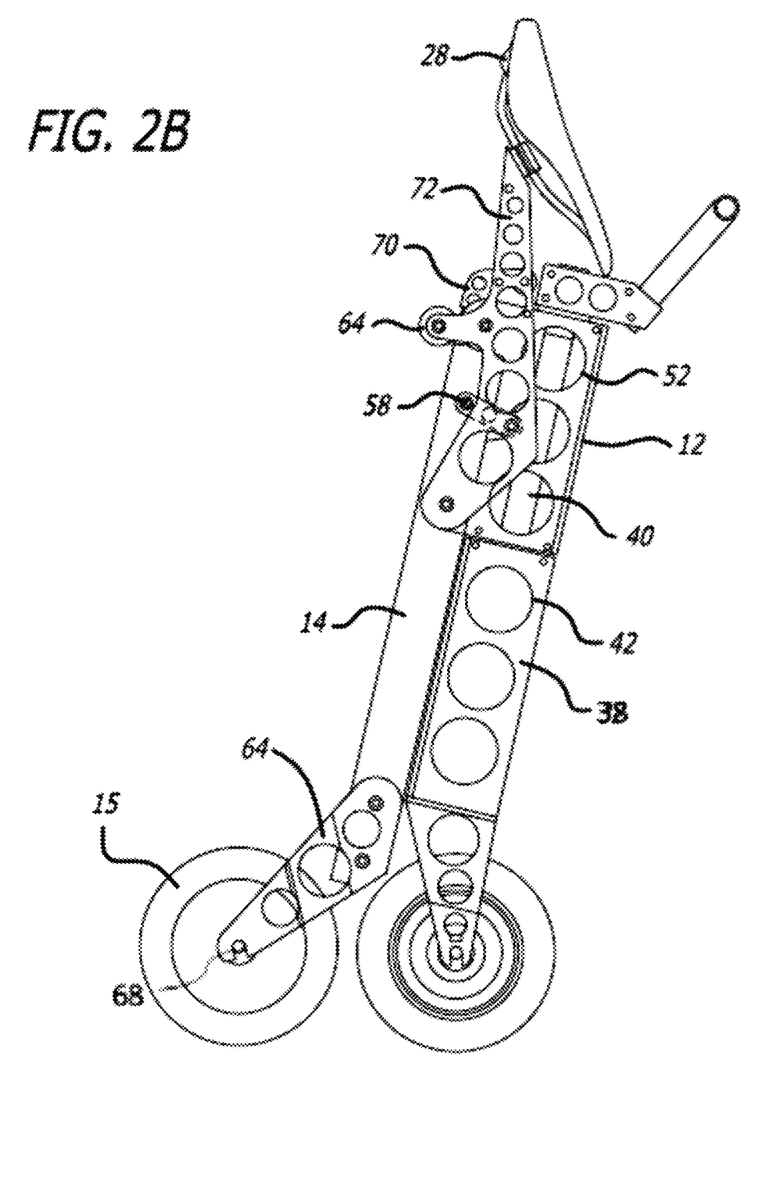

As shown in FIGS. 2a and 2b, in many embodiments, in the compact folded configuration the front, rear and seat structural members (12, 14 & 16) are all pivoted about the pivot such that their axes (22, 23 & 24) are disposed roughly parallel to each other. In some embodiments of the vehicle, such as the one shown in FIG. 1b, the axes (22, 23 & 24) of the structural members are disposed parallel on to the other, and the structural members (12, 14 & 16) themselves are moved into a configuration in which they are positioned adjacent to one another. In one such embodiment, the pivoting of the structural members comprises a scissoring motion about the pivot points such that the distal ends of each of the structural members (30, 31 & 32) come together to face in a single direction, again as shown in FIG. 2a, for example. In some such embodiments, the seat (28) disposed on the seat-bearing element is positioned upward above the ends (30 & 32) of the wheel-bearing structural elements distal from the wheels.

Additional views of the vehicle of FIGS. 1a and 2a, in open and closed positions, in partial phantom to show the internal mechanism are provided in FIGS. 1b and 2b.

Although the above description and the embodiments of the vehicle shown in FIGS. 1a and 2a, describe an electric vehicle having a two-wheel configuration (in which the front wheel assembly (13) comprises a single wheel and the rear wheel assembly (15) comprises a single wheel), it will be understood that other wheel configurations may be provided that have considerably the same elements and operate in a manner commensurate to that described above. For example, the vehicle may have a three wheel configuration (in which the rear wheel assembly comprises a pair of double wheels), or the vehicle may have a four-wheel configuration (in which the rear wheel assembly has a single main wheel and a pair of convertible or foldable wheels that may extend on either side of the main wheel to provide additional stability.

Turning now to the detailed construction of the vehicle, several of the elements comprising the vehicle will be described, including the front and rear wheel-bearing structural members, and the seat-bearing structural member and all attendant structures and accessories. Examining first the front wheel-bearing structural member, FIGS. 1b and 2b provide illustrations of embodiments of the vehicle (10) and the front wheel-bearing structural member (12).

As shown in FIGS. 1b and 2b, in many embodiments the vehicle (10) comprises a front wheel-bearing structural member (12) having at least one front wheel assembly (13) mounted thereto, and a steering mechanism, such as a handlebar or other suitable structure (34) interconnected therewith. In some such embodiments, the steering mechanism (34) can be used to alter the orientation of the front wheel assembly (13) relative to the vehicle, and thus to steer the vehicle when in the open/riding position (FIG. 1b), and to maneuver the vehicle when in the closed/compact position (FIG. 2b). Although in the embodiments shown in FIGS. 3a to 3d, the wheel assembly might be fixedly attached to the front wheel-bearing assembly, and the entire front wheel-bearing assembly could be pivotable relative to the remaining vehicle structure through a pivotable interconnect (36), in other embodiments the wheel assembly (13) may itself pivotally interconnected to the front wheel-bearing structural member (12) through a rotatable pivot interconnection. Regardless, in many embodiments the steering mechanism may be interconnected relative to the wheel assembly and front wheel-bearing structural member such that the orientation of at least the front wheel relative to the remainder of the vehicle may be altered.

Although a specific "T"-shaped handlebar steering mechanism (34) is shown in the figures, it will be understood that the steering mechanism may be of any shape suitable and dimension such that a rider may use the mechanism to alter the directional motion of the vehicle. For example, a "U"-shaped handle bar steering mechanism may be contemplated. In addition, in some embodiments the height of the steering mechanism may also be adjustable, such as, for example, via a telescoping mechanism, for convenience and comfort of use, and in some embodiments to allow the steering mechanism to be collapsed for storage such that the height of the handle bars do not extend above the height of the remainder of the vehicle. In embodiments, the steering mechanism may have handles that extend out from the sides of framework, such as in a "T" configuration the handle extensions may retract or fold into a more compact form.

Although not shown, in various embodiments the steering mechanism (34) may be pivoted between an open position in which the axis of the steering mechanism is angled away from the axis (20) of the front wheel-bearing structural member (12), and a closed compacted position, in which the axis of the steering mechanism is aligned along the vertical axis of the front wheel-bearing structural member. In many embodiments, it may be desirable to prevent motion of the front wheel assembly relative to the vehicle in the compact folded or closed position, i.e., to lock the orientation of the wheel relative to the vehicle. In such embodiments a wheel locking mechanism may be provided to prevent the wheel and/or wheel assembly (13) from changing orientation relative to the vehicle in such a folded closed configuration. Although any suitable wheel locking mechanism may be provided, in the embodiments shown the pivotable portion (38) of the front wheel bearing member may be pressed against the rear wheel bearing member (14) such that it cannot pivot relative thereto when in the compacted configuration. Although not shown some embodiments a tab or other element may also be provided on the pivotable portion of the wheel or wheel assembly such that in the close folded configuration the tab engages the adjacent rear wheelbearing assembly or other immobile portion of the vehicle to prevent independent motion of the wheel or wheel assembly, and thereby a change in the orientation of the wheel and/or wheel assembly relative to the vehicle.

Turning now to the construction of the front wheel-bearing assembly (12), as shown in FIG. 2b, in many embodiments the front wheel-bearing structural member is formed of an elongated body that may be made hollow such that the body defines an interior volume (40). The structural member may be formed from any material suitable to provide sufficient structural support to the vehicle, such as, for example, a metal, composite, or polymer. In many embodiments, as shown in FIG. 2b, the front wheel-bearing structural member (12) may include fenestrations (42) along the elongated body. Although certain fenestrations are shown in the figures, the number and configuration of such fenestrations may take any geometry or shape suitable maintain the structural integrity of the structural member.

In many embodiments, as shown in FIG. 1b for example, the front wheel-bearing structural member (12) may further comprise a pair of pivot hinge brackets (44 & 46) disposed along its length and configured such that the front main pivot hinge brackets may be cooperatively coupled with the main pivot hinge brackets provided on the rear wheel-bearing structural member (48) and the seat-bearing structural member (50) to form the vehicle pivot mechanism to allow the front wheel-bearing structural member (12) to pivot relative to the other structural members (14 and 16) that form the structure of the vehicle. Such a front main wheel-bearing structural member may also comprise a pivot indentation (52) configured and disposed to allow a portion of the pivot mechanism to fold therein when the vehicle is moved into the compact or folded configuration.

The front wheel-bearing structural member may also comprise certain accessories (not shown), such as, for example, lights, charging connections, personal electronic docking connections, etc. Although the energy storage and vehicle propulsion systems may be distributed across the various structural members and elements of the vehicle, in many embodiments the energy storage elements, such as, for example, one or more batteries (39) may be disposed within the internal volume (40) of the front wheel-bearing structural member along with any required electronics, electric interconnections, etc. necessary for the operation of the electric vehicle, as shown in FIG. 1c.

As shown in FIG. 1b, the front wheel assembly (13) generally comprises a wheel (54a) rotatable interconnected with the assembly, such as via an axle (54b) or other suitable rotatable interconnection. The front wheel assembly may also include front footrests (not shown), which may take any suitable form, such as, for example, a peg or pedal. Such a footrest may be foldable or retractable to reduce the profile of the footrest relative to the wheel assembly. Finally, the wheel assembly may include other accessories, such as, for example, a fender or mud-flap (not shown) mounted about the wheel to decrease water or other debris from being splattered against the rider during operation. Suitable fenders may be attached through fenestrations (42) provided in the wheel-bearing assembly (12). Although the motor or other propulsion means may be distributed across the vehicle and interconnected via suitable drive interconnections, in many embodiments the vehicle propulsion mechanism (not shown) may be disposed within the wheel assembly, such as within the hub (54c) of the wheel to provide motive force to the vehicle. In many such embodiments the propulsion mechanism may include an electric motor disposed within the hub of the wheel of the wheel assembly (13) and electrically interconnected with the energy storage elements disposed elsewhere in the vehicle.

Examining now the rear wheel-bearing structural member, FIGS. 1b and 2b provide views of embodiments of the vehicle (10) and the rear wheel-bearing structural member (14). As shown, in many embodiments the vehicle (10) comprises a rear wheel-bearing structural member (14) having a seat-bearing assembly (16) and front wheel structural member (12) interconnected therewith. In such embodiments, the rear wheel-bearing structural member (14) is interconnected at an end distal to the rear wheel (56) to the front wheel-bearing structural member (12) through a pivot interconnection (44/48), and a seat-bearing structural member (16) which it is pivotally interconnected with along its length through an elongated linking bracket (58) connected at its first end (60) with the rear wheel-bearing assembly (14) and at its second end (62) along the length of the seat-bearing structural member (16) via a pair of pivotable interconnections (60/62) which links the movement of the rear wheel-bearing structural member and the seat-bearing post such that when one pivots the other pivots. In various embodiments the elongated linking bracket folds into the folding indentation (52) when the vehicle is in the compacted configuration, as shown in FIG. 2b.

The seat-bearing structural member (16) in some such embodiments may be further interconnected with the rear wheel-bearing structural member (14) through a fourth structural member referred to herein as a seat support element (64), as shown in FIG. 1b, to provide further weight-bearing support to the seating platform (28) of the seat-bearing structural member during operation of the vehicle. In many embodiments, as shown, the seat support element comprises a wheel configured to support the seat bearing member (16) and seat platform (28) when in a riding configuration, and to roll along the rear-wheel bearing member (14) during compaction, as shown in FIG. 2b. Although a seat support element comprising a rotatable element (such as cylinder or wheel for example) is shown and described in the figures it will be understood that alternative designs may be used including a non-rotatable resilient member, such as a shock-absorber or other such element. Such alternative seat supporting elements may be disconnectable from the rear-wheel bearing member, such as is shown in the figures, or may be interconnected therewith throughout the movement of the members from riding to compacted configurations.

As shown in FIG. 1b, the rear wheel-bearing structural member (14) further comprises a rear wheel assembly (15) at a second end (66) distal from the pivot assembly (44/48). Turning now to the construction of the rear wheel-bearing assembly (15), as shown in FIG. 2b, in many embodiments the rear wheel-bearing structural member is formed of an elongated body that may be made hollow such that the body defines an interior volume. Although the structural member is shown as being tubular, it will be understood that the member may take any suitable cross-section. The structural member (14) may also be formed from any material suitable to provide sufficient structural support to the vehicle, such as, for example, a metal, composite, or polymer. Although not shown, in many embodiments the weight of the rear wheel-bearing structural member may be lightened by including fenestrations along the body thereof.

As further shown in FIG. 2b, for example, in many embodiments, the rear wheel-bearing structural member (14) may comprise, at its lower end, an interconnection point (64) such that a wheel assembly (15) may be interconnected therewith. In some such embodiments, such an interconnection may comprise a rear axle such that the wheel may rotate relative to the rear wheel-bearing assembly.

In many embodiments, as discussed in relation to FIGS. 1b and 2b, the rear wheel-bearing structural member (14) may further comprise a pair of rear main pivot interconnects (48 & 60) disposed along its length and configured such that the rear pivot interconnects may be cooperatively coupled with the pivot interconnections on the other structural members (12 and 16) to combine to form the vehicle main pivot mechanism to allow the rear wheel-bearing structural member (14) to pivot relative to the other structural members (12 and 16) that form the structure of the vehicle.

Although not shown, other accessories may be included with the rear wheelbearing structural member, including lights, charging connections, personal electronic docking connections, luggage racks, etc. Although the energy storage and vehicle propulsion systems may be distributed across the various structural members and elements of the vehicle, in many embodiments the energy storage elements, such as, for example, one or more batteries may be disposed within the internal volume of the rear wheel-bearing structural member along with any required electronics, electric interconnections, etc. necessary for the operation of the electric vehicle.

Figure 3A:
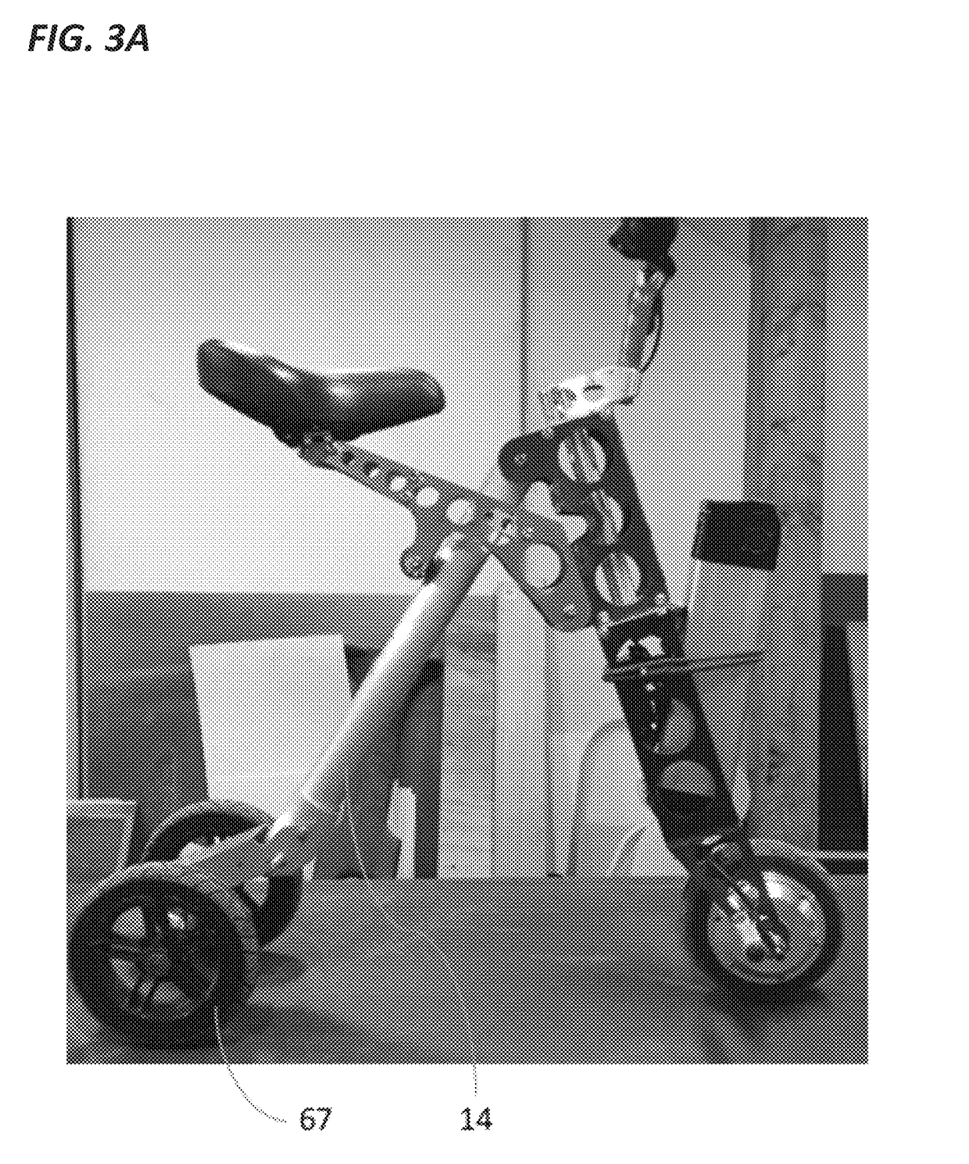
FIGS. 3a and 3b provide side, rear and perspective views of a three-wheeled foldable electric vehicle in accordance with embodiments of the invention.
Figure 3B:
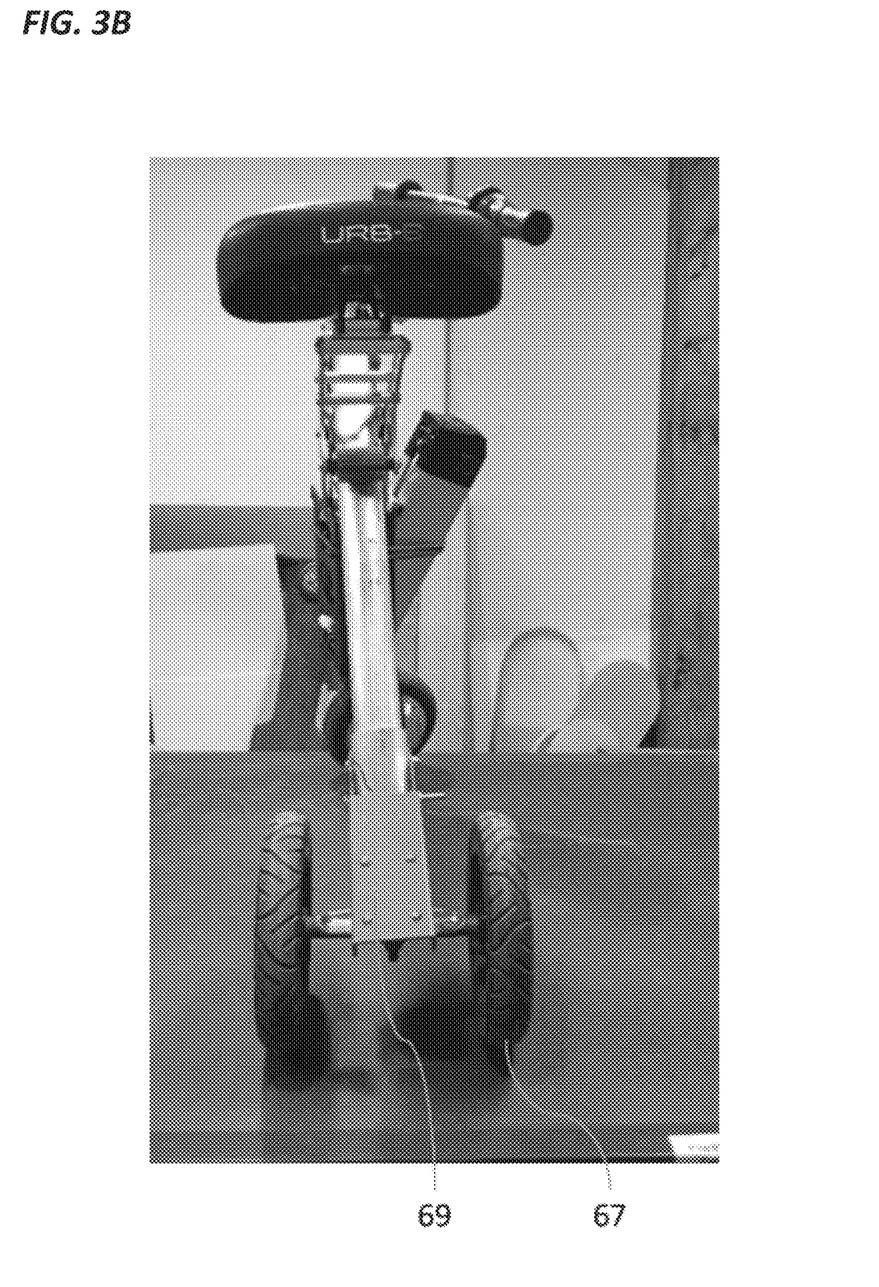

As described above a rear wheel assembly (15) is mounted to the lower end of the rear wheel-bearing structural member (14). As shown in the figures, this rear wheel assembly may comprise one or multiple wheels (56) in accordance with embodiments of the vehicle. In many embodiments, as discussed in relation to FIG. 2b, the rear wheel assembly (15) comprises an axle (68) fixedly attached at the lower end (66) of the rear wheel-bearing structural member (14). In some embodiments this fixed axle may comprise one or a plurality of wheels (67), such as on a pivotable or unpivotable truck (69), as shown in FIGS. 3a and 3b. Although not shown, in some embodiments the rear wheel assembly (15) may include resilient members, such as shock absorbing springs, to provide a shock dampening to the vehicle. In some such embodiments, the wheel or wheels of the rear wheel assembly may also be affixed to the rear wheel bearing structural member (14) in a configuration that would allow the wheels to move relative to the rear wheel-bearing structural member. (Examples of suitable rear wheel configuration may be found in US Patent Pub No. US2016/0347397, the disclosure of which is incorporated herein by reference.)

Finally, it will be understood that in many embodiments the either the front or rear wheel assemblies may be configured as a removable and/or interchangeable structure, such that the wheels of the vehicle may be removed and the vehicle can be reconfigured between a single or dual-wheel design as desired by the user. This interchangeability can be accomplished by interconnecting one or both of the front or rear wheel assemblies (whether single or dual wheel design) via removable bolts, or a quick-connect attachment, such as, for example, a spring-loaded pin, latch, or other coupling. In embodiments where a two-wheel vehicle design is desired, the vehicle may further include a kickstand or otherwise retractable support, such that the vehicle may stand when unattended by the user.

Examining now the seat-bearing structural member, FIGS. 1b and 2b provide perspective views of the seat-bearing structural member (16) and the seat-bearing structural member support (64), respectively. As shown in FIG. 1a, in many embodiments the seat-bearing structural member (16) generally comprises an elongated structural member having at one end distal to the seat platform (28) a seat pivot bracket (46/50) interconnectable to the front wheel-bearing member. In some embodiments the seat-bearing member also comprises a second pivot interconnection (62) interconnected through the linkage bracket (58) to the rear wheel-bearing member. Together the pivot interconnections are configured to cooperatively interconnect with the pivot interconnections of the front and rear wheel-bearing structural members (12 and 14) to form the main vehicle pivot mechanism to allow the seat-bearing structural member (16) to pivot relative to the other structural members (12 and 14) that form the structure of the vehicle.

Such a seat pivot mechanism may also comprise a locking mechanism configured to engage a cooperative locking mechanism on one or more of the other structural members (12 and 16) of the vehicle to prevent unintended movement of the structural members relative to one another. In some embodiments, as shown in FIGS. 1b and 2b, the locking mechanism comprised of a movable lock disengagement latch (70) configured to engage a cooperative locking structural portion of the rear wheel bearing structural member (as shown in FIG. 2b) such that the engagement and disengagement of the locking mechanism is activated by manipulating the seat-bearing structural member, as will be described in greater detail below.

In many embodiments, as shown in FIG. 2b, the seat-bearing structural member (16) also comprises a seat-bearing structural member support bracket for connecting the seat-bearing structural member (64). In some embodiments the seat-bearing structural member may be formed of a rotatable element (such as, for example, a cylinder or wheel) formed of a resilient material, such as, for example, rubber or other polymeric material. In such embodiments, the resilient seat-bearing structural member may be slidingly interconnected with the rear wheel-bearing structural member (14) to form a triangulated support structure that cantilevers the seat-bearing structural member (16) into a riding position in the open/riding configuration of the vehicle to dampens the shocks or bumps of the road such that the rider experiences a smoother ride.

Figure 4:
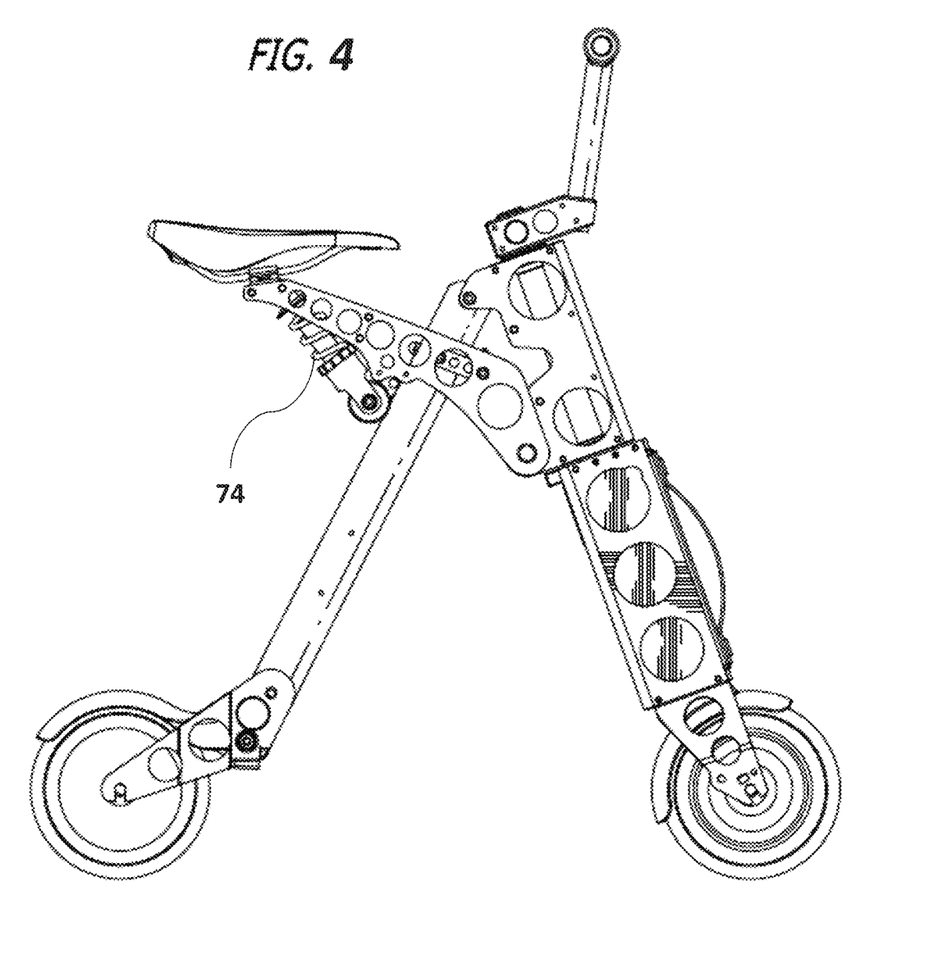
FIG. 4 provides a side view of a seat support for a foldable vehicle in accordance with embodiments of the invention.

In various other embodiments, as shown in FIG. 4, the seat-bearing structural member may include a resilient member (74) (e.g., a shock absorber or other spring or pneumatic element) for dampening any shocks and bumps such that they are not transmitted fully to the seat (28).

The seat-bearing structural member (16) may also comprise certain accessories, such as, for example, lights, charging connections, personal electronic docking connections, (not shown), etc. Although the energy storage and vehicle propulsion systems may be distributed across the various structural members and elements of the vehicle, in many embodiments the energy storage elements, such as, for example, one or more batteries may be disposed within the internal volume of the seat-bearing structural member along with any required electronics, electric interconnections, etc.

necessary for the operation of the electric vehicle. The structural member may be formed from any material suitable to provide sufficient structural support to the vehicle, such as, for example, a metal, composite, or polymer. As shown in FIG. 2b, in many embodiments the seat-bearing structural member may include fenestrations (72) along the elongated body thereof. Any number and configuration of such fenestrations may take any geometry or shape suitable maintain the structural integrity of the structural member. The position of the seat-bearing structural member (16) and/or the seat platform (28) may be adjustable relative to the remainder of the vehicle. In such embodiments adjustments might include height relative to the ground, distance relative to the handlebars, angle relative to the other components, etc. Although one embodiment of a seating platform (28) comprising a bicycle-style seat is shown in FIG. 2b, it will be understood that the riding platform may take any form, style or shape suitable to support a rider.

As shown in detail in FIGS. 1a and 1b, each of the structural members includes a plurality of cooperative pivot interconnections (44/48, 46/50, 60 & 62), each of which engage and pivot during compaction or expansion of the vehicle. In many embodiments each of the pairs of cooperative pivot hinge interconnections are disposed in a nested arrangement, wherein the seat pivot interconnections (19 & 20) form the outer elements relative to the front wheel-bearing and rear wheel-bearing members, and the front pivot hinge bracket (18) forms the outer element relative to the rear wheel-bearing member, although this configuration may be reordered without effecting the operation or function of the folding function of the vehicle.

In many embodiments, as will be described in relation to FIGS. 1b and 2b, the vehicle pivot mechanism may further comprise a cooperative locking mechanism configured to be moved between a first locking position where the vehicle, including structural member and seat-bearing post, are disposed and secured in the compacted position, and a second unlocked position where the vehicle is disposed in an open/riding position. Although such a cooperative locking mechanism may take any suitable form, in some embodiments, as shown in the figures, the mechanism may take the form of a latch mechanism (70). In one such embodiment, a pivotable latch member (70) is disposed in association with the seat-bearing member (16) and is configured to disengage and engage a cooperative portion of the rear wheel-bearing member (14) formed into the top portion of the member. In embodiments the locking latch (70) is disengaged from the closed/compacted position by pulling up on the seat-bearing structural member (16). Again, it should be understood that although a specific arrangement of cooperative locking elements are described, any suitable locking mechanism and arrangement of elements may be provided. In many embodiments, such locking mechanisms and arrangements are configured such that the locking mechanism is disengaged by lifting the seat-bearing structural member. Likewise, although only two locking positions are described above, it will be understood that intermediary locking positions may be defined such that desirable vehicle configurations may be stably formed.

Turning now to the operation of the folding mechanism of the electric vehicle (10), as described above, and as will be discussed in relation to the figures, in many embodiments the two wheel-bearing structural members (12 and 14), and the seat bearing structural member (16) of the vehicle (10) are all pivotally interconnected such that a single folding mechanism operates to moveably reposition all the structural members of the vehicle cooperatively. As shown, in many embodiments the folding mechanism comprises a plurality of pivot interconnection about which each of the structural members (12, 14 and 16) are pivotally interconnected. A locking mechanism (70) comprising, in many embodiments, a latch arrangement, disposed along the seat bearing structural member (16) may also be provided to lock the structural members of the vehicle into the compact configurations. In many such embodiments the locking mechanism (70) is disengaged by manipulating the seat-bearing structural member (16), such as, for example, by lifting upward on the structural member.

During operation of some embodiments, the locking mechanism (70) is disengaged from the closed/compacted position by pulling up on the seat-bearing post (16), as shown in FIGS. 1a and 2a. In some such embodiments, the locking mechanism (70) includes a latch mechanism, wherein the seat lock disengagement latch of the seat-bearing structural member (16) engages the top of the rear wheel-bearing structural member (14). In addition, in some embodiments the seat-bearing support (64) slides along the rear wheel-bearing member (14) during compaction. In addition, although not shown in some embodiments a resilient member, such as a spring may be provided to apply a resilient guiding force to the interconnections thereby assisting in advancing the movement and operation of the folding mechanism of the vehicle.

It should be understood that although the illustrated embodiments show specific configurations of locking mechanisms, including particular geometries, dispositions and configurations of pins, channels, grooves, notches, etc. that these elements could be modified substantially while maintaining the functionality of the vehicle folding mechanism such that a single cooperative pivot point and locking mechanism is provided capable of being engaged and operated to simultaneously folding the structural members of the vehicle from an open/riding position such that the seat is extended outward away from the structural member, and a second/closed position at which the seat is locked into a compact position where the seat is folded against or flush with the second structural member, via the manipulation of one of the structural members of the vehicle, such as, for example, the seat-bearing structural member.

In addition, it will be understood that other accessories may be incorporated with the vehicle, including, for example, baskets, lights, cup holders, cell phone chargers and cradles, etc. Many of these accessories are described in US Patent Pub No. US2016/0347397, the disclosure of which is incorporated herein by reference.

DOCTRINE OF EQUIVALENTS

As can be inferred from the above discussion, the above-mentioned concepts can be implemented in a variety of arrangements in accordance with embodiments of the invention. For example, though the foldable vehicle has been described in relation to an electric vehicle, it will be understood that the construction and folding mechanism described could be adapted for use with other propulsion types, including, for example, a gasoline powered internal combustion engine. Likewise, although the vehicle has been described in relation to two wheel-bearing structural members, it will be understood that any number of structural members could be used along with the proposed vehicle folding mechanism.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A vehicle comprising:

a front and a rear wheel-bearing structural members having first and second ends and each defining a wheel-bearing structural member longitudinal axis, each of said wheel-bearing structural members having at least one wheel assembly interconnected to the second end thereof, a first wheel-bearing structural member pivot interconnection disposed at the first end thereof, and a second wheel-bearing structural member pivot interconnection disposed along a length thereof between the first and second ends;

at least one seat-bearing structural member having first and second ends and defining a seat-bearing structural member longitudinal axis, the seat-bearing structural member having a seating platform interconnected to the second end thereof and at least two seat-bearing pivot interconnections, a first seat-bearing pivot interconnection disposed at the first end thereof, and a second seat-bearing pivot interconnection disposed along a length thereof between the first and the second ends; and wherein the first wheel-bearing structural member pivot interconnections disposed on the first ends distal to the wheel assemblies are pivotably interconnected, and the second wheel-bearing structural member pivot interconnections disposed on the lengths thereof are pivotably interconnected with the seat-bearing pivot interconnections and are configured to cooperatively interconnect to form a vehicle pivot mechanism such that the structural members are pivotably interconnected to move between at least two configurations:

a riding configuration wherein the longitudinal axes of the two wheel-bearing structural member and the seat-bearing structural members have angular offsets relative to each other, and a folded configuration wherein the longitudinal axes of the two wheel-bearing structural members and the seat-bearing structural member are roughly parallel; and further comprising a pivot locking mechanism configured to disengageably lock the structural members in at least the folded configuration, wherein the pivot locking mechanism comprises a latch disposed on the seat-bearing member and configured to engage the first end of at least one of the at least two wheel-bearing structural members.

2. The vehicle of claim 1, wherein a portion of the front wheel-bearing structural member pivots with the wheel assembly.

3. The vehicle of claim 1, wherein the rear wheel-bearing structural member is tubular.

4. The vehicle of claim 1, wherein the latch is configured to engage the first end of the rear wheel-bearing structural member.

5. The vehicle of claim 1, wherein the latch is configured to disengage when the seat-bearing structural member is pivoted upward when in the second compacted configuration.

6. The vehicle of claim 1, wherein the rear wheel assembly comprises at least two wheels interconnected via a fixed axle.

7. The vehicle of claim 1, further comprising at least one electric motor disposed within at least one of the wheel assemblies and an energy storage device interconnected therewith.

8. The vehicle of claim 1, wherein in the folded configuration the seating platform is disposed above the first ends of the wheel-bearing structural members.

9. The vehicle of claim 1, wherein at least one of the wheel-bearing structural members comprises a plurality of fenestrations configured to provide acess to the internal volume thereof.

10. The vehicle of claim 1, wherein a steering mechanism is mounted to a front wheel-bearing structural member, the steering mechanism being configured to controllably pivot the wheel assembly mounted to the front wheel-bearing structural member about the longitudinal axis of the front wheel-bearing structural member.

11. The vehicle of claim 10, wherein the front wheel is locked in a non-pivoting configuration relative the longitudinal axis of the front wheel-bearing structural member in the folded configuration.

12. The vehicle of claim 10, wherein the steering mechanism comprises at least one handlebar, and wherein the height and angle of the handlebar relative to the vehicle is adjustable.

13. The vehicle of claim 1, wherein at least a portion of the front wheel-bearing structural member defines an internal volume having an energy storage device disposed therein.

14. The vehicle of claim 13, wherein the energy storage device is removable from the internal volume.

15. The vehicle of claim 1, further comprising a seat support disposed along the length of the seat-bearing structural member and slidingly engaged along the length of the rear wheel-bearing structural members.

16. The vehicle of claim 15, wherein the axis of the seat support is roughly orthogonal with the axis of the seat-bearing structural member.

17. The vehicle of claim 15, wherein the seat support comprises one of either a resilient wheel or a cylinder.

18. The vehicle of claim 1, wherein the rear wheel-bearing structural member and the seat-bearing structural member are pivotably interconnected through an elongated linkage.

19. The vehicle of claim 18, wherein the front wheel-bearing structural member comprises an indentation into which the linkage is disposed in the folded configuration.

* * * * *